(12) United States Patent
Fossen

(10) Patent No.: US 10,569,944 B2
(45) Date of Patent: Feb. 25, 2020

(54) CONTAINER WITH ADAPTIVE STORAGE VOLUME

(71) Applicant: Bjørn Fossen, Nesøya (NO)

(72) Inventor: Bjørn Fossen, Nesøya (NO)

( * ) Notice: Subject to any disclaimer, the term of this patent is extended or adjusted under 35 U.S.C. 154(b) by 168 days.

(21) Appl. No.: 15/642,362

(22) Filed: Jul. 6, 2017

(65) Prior Publication Data

US 2017/0297789 A1   Oct. 19, 2017

Related U.S. Application Data

(63) Continuation of application No. PCT/NO2016/050002, filed on Jan. 8, 2016.

(30) Foreign Application Priority Data

Jan. 9, 2015   (NO) .................................. 20150048

(51) Int. Cl.
   *B65D 39/00*   (2006.01)
   *B65D 51/26*   (2006.01)
   (Continued)

(52) U.S. Cl.
   CPC ............... *B65D 51/26* (2013.01); *A23L 3/00* (2013.01); *A47J 47/02* (2013.01);
   (Continued)

(58) Field of Classification Search
   CPC .... B65D 51/26; B65D 43/0229; B65D 47/32; B65D 81/24; B65D 21/086; B65D 39/00;
   (Continued)

(56) References Cited

U.S. PATENT DOCUMENTS

| | | | | |
|---|---|---|---|---|
| 4,215,786 A * | 8/1980 | Vertes | ................... | B65D 51/26 206/591 |
| 5,911,338 A | 6/1999 | Miller | | |
| 6,484,897 B1 * | 11/2002 | Crawley | ............... | B65D 11/04 215/307 |

FOREIGN PATENT DOCUMENTS

| | | |
|---|---|---|
| DE | 29504252 U | 6/1995 |
| DE | 29919397 U | 2/2000 |

(Continued)

OTHER PUBLICATIONS

International Search Report, International Application No. PCT/NO2016/050002.

(Continued)

*Primary Examiner* — Andrew T Kirsch
*Assistant Examiner* — Elizabeth J Volz
(74) *Attorney, Agent, or Firm* — Richard A. Fagin

(57) ABSTRACT

A container (1) for storage of solids, discrete elements, granular materials or liquid, comprises a base (2) and a lid (3) and the base (2) are suitable for forming an air tight storage volume (23). The base (2) and lid (3) comprise respective base closing devices (24) and lid closing devices (34) arranged to cooperate to close the container (1) and limit relative movement between the base (2) and the lid (3) by the closing devices (24, 34). The lid (3) has an lid base (33) and an adaptation device (35) arranged between the lid closing devices (34) and the inner part of the lid (33). The adaptation device (35) is placed to push the lid base (33) from the lid closing device (34) toward a bottom (21) of the base (2) for adaptation of the storage volume (23) to the content (4) in the container (1).

19 Claims, 4 Drawing Sheets

(51) Int. Cl.
    *B65D 81/24*        (2006.01)
    *A47J 47/02*       (2006.01)
    *A23L 3/00*        (2006.01)
    *B65D 43/02*       (2006.01)
    *B65D 47/32*       (2006.01)

(52) U.S. Cl.
    CPC ......... *B65D 43/0229* (2013.01); *B65D 47/32* (2013.01); *B65D 81/24* (2013.01); *A23V 2002/00* (2013.01)

(58) Field of Classification Search
    CPC ..... B65D 41/485; A23L 3/00; A23V 2002/00; A47J 47/02
    USPC ...... 220/578, 666, 8; 215/231, 262; 206/814
    See application file for complete search history.

(56) References Cited

FOREIGN PATENT DOCUMENTS

| | | | | |
|---|---|---|---|---|
| DE | 19850501 A1 | 5/2000 | | |
| DE | 19936808 A1 | 3/2001 | | |
| EP | 0638274 A1 | 2/1995 | | |
| FR | 1289628 | * | 4/1962 | ............ B65D 39/00 |
| FR | 1289628 A | 4/1962 | | |
| JP | 2009280281 A | 12/2009 | | |
| WO | 2014071577 A1 | 5/2014 | | |

OTHER PUBLICATIONS

Written Opinion of the International Search Authority, International Application No. PCT/NO2016/050002.

\* cited by examiner

CONTAINER WITH ADAPTIVE STORAGE VOLUME

CROSS REFERENCE TO RELATED APPLICATIONS

Continuation of International Application No. PCT/NO2016/050002 filed on Jan. 8, 2016. Priority is claimed from Norwegian Patent Application No. 20150048 filed on Jan. 9, 2015. Each of the foregoing applications is incorporated by reference herein in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

The present invention relates generally to storage of a content in the form of solids, discrete elements, granular materials or liquid. More particularly, the invention relates to a container to protect said content to be stored by adapting a storage volume to the content. Said protection may consist in reducing the remaining storage volume of the container at the closed state and/or moisture transport from or to the content. More particularly, the protection may consist in displacing principally all air remaining in the storage volume. Still more particularly, the invention relates to a box comprising a lid which adaptively adjusts to the contents of the box.

A specific example of a particularly relevant embodiment of the invention is a container for food products such as potato cakes, tortillas or the like, wherein the container among other things prevents these from drying out.

There exists a large number of solutions for the storage of objects in solid form in general and containers that prevent the drying out of food products in particular.

There also exist solutions with an adaptive storage volume.

British Patent Application Publication No. GB 2372732 A discloses a container with adjustable volume. The container for food or beverage comprises a mainly circular base plate with vertical upright walls defining an open chamber, and a lid which is received slidable and sealable in the chamber in a movable manner for varying the size of the chamber to reduce the air space above the contents. The lid comprises a vent hole which can be closed, and a ring gasket.

U.S. Pat. No. 5,911,338 issued to Miller discloses an adjustable container for storage with a volume that can be adjusted to the size or quantity of articles in the container. The device comprises a base plate having side walls circumferentially defining an interior space. The side walls have a height that can be adjusted to vary the volume of the inner volume. A removable lid is provided to mainly cover the opening into the inner volume.

Certain limitations of the solutions known in the art are as follows.

The solution according to the above cited GB 2372732 A necessitates manual sliding and turning operations to adjust the volume and to close the container. Furthermore it represents a relatively complex solution which is fairly expensive to produce. In addition, the volume is not automatically adjusted to the content.

The solution according to U.S. Pat. No. 5,911,338 also requires certain actions, where the wall in the box comprises a bellows, to adjust the volume automatically to the content. Furthermore, the disclosed container also requires manual operations in terms of turning and/or pushing.

Solutions known in the art present a number of problems. By resealing the standard packaging that the products are packed in, it is very difficult to remove the air that contributes to the drying out of food products. This is enhanced by the fact that the smaller number of units of food products, the greater the desiccation.

Another problem is that the content is of a relatively dry character that can attract moisture. Thereby, for instance, the crispness of the product may be reduced.

Another problem is that the content of the container may be damaged by moving within the container.

SUMMARY

The present invention in one aspect is a product solution for the storage of different contents. This may be food products such as potato cakes, tortillas and lefse, but also other food products such as, e.g., cooked ham, sliced cheese or coffee. However, the scope of the invention is not limited to food products, but could also be considered used for storing other things such as drugs or paint.

The invention relates to a container for storing contents such as solids, discrete elements, granulates or liquid, where the container comprises a base and a lid, wherein the lid and the base are suitable for forming a mainly airtight storage volume. The base and lid comprise, respectively, base closing devices and lid closing devices arranged so that they work together to close the container and limit the relative movement between the base and the lid by the closing devices. The lid further comprises a lid base and an adaptation device arranged between the lid closing devices and the lid base, wherein the adaptation device is placed to push the lid base of the lid from the lid closing devices toward a bottom of the base for adaptation of the storage volume to the contents in the container.

A main object of the invention is to provide a container which solves the problems of the prior art.

A further main object is to provide a solution for storage primarily for repeated use or a packaging primarily for one-time use or for use a few times only.

An object of the invention is to provide an environmentally friendly solution in connection with the storage of food products.

A further object is to provide a packaging solution which is resource-friendly in that it can be used a practically unlimited number of times.

Another object is to improve storage properties so that the food product retains its quality better over time and thus can also be stored for longer periods without having to be discarded.

Still another object is preventing air from flowing to and from the storage volume.

Another object is to maintain the quality of the content, for instance in terms of taste or aroma.

Another object is to provide a cost-effective packaging solution.

Still another object is to provide a simple solution that is well suited for mass production.

Furthermore, it is an object to provide a user-friendly and ergonomically favorable solution.

Still a further object is to provide simple and effective cleaning in general and cleaning in a dishwasher in particular.

Yet another object is to ensure favorable storage in that the solution automatically and effectively adjusts the volume to the filling ratio of the box.

Still another object is to displace principally all air in the container and to prevent transfer of moisture from and to the content.

Furthermore, the solution ensures effective closure by a "snap-solution" that also provides the user a feedback that the box is closed.

One aspect of the invention is a container for storing contents such as solids, discrete elements, granular materials or liquid, where the container comprises a base and a lid, wherein the lid and the base are suitable for forming a mainly airtight storage volume. The base and lid comprise respectively base closing devices and lid closing devices arranged so that they work together to close the container and limit the relative movement between the base and the lid by the closing devices. The lid further comprises an lid base and an adaptation device arranged between the lid closing devices and the lid base, wherein the adaptation device is placed to push the lid base of the lid from the lid closing devices toward a bottom of the base for adaptation of the storage volume to the contents in the container.

The lid base together with the adaptation device can advantageously be arranged to adapt the storage volume when the lid is put on the base before the container is closed by co-operation between the closing devices.

The adaptation device may comprise a resilient structure, where the resilient structure may have a cross section in one of the following forms: a bellows, a V-shape or a U-shape.

The adaptation device may form a closed structure between the lid base of the lid and the lid closing devices.

The resilient structure may advantageously provide a resilient force adapted to the cross-section and properties of the storage volume to a content that the container is designed to store.

The closing devices may well comprise a projecting part and a correspondingly shaped receiving part arranged to snap the lid fixed to the base, or they may comprise a bayonet fitting or threaded screw solution.

The inner part of the lid, that is, the lid base, and the adaptation device can be adapted to the base so that gas in the storage volume is allowed to evacuate when the lid is placed on the container to minimize remaining volume. Further, the lid may comprise openings to let air in and out of the inner volume of the lid to provide effective adaptation of the lid to the remaining storage volume and to provide access to the inner volume of the lid for cleaning. Said openings can be designed so that they can be used in the opening and closing of the container.

The lid may include spoke like elements from the lid's center toward the lid's periphery, and where the openings are defined by the spoke like elements.

The base may be principally cylindrical with upward rising walls arranged perpendicular to the bottom surface. Further, the lid base may have a cross-section which is mainly similarly shaped as a horizontal cross-section of the base. Said similarly shaped cross-sections may advantageously be equally large so that the base of the lid prevents air flow to and from the storage volume.

The bottom surface may be principally circular. Furthermore, the container (1) is adapted to food products shaped like a circular disc.

The container may be formed in matter comprising one or more of plastic, glass and metal.

The present invention achieves objects established above by a container as defined in the introduction to the independent claims, having the features in the characterizing portion thereof.

A non-exhaustive number of embodiments, variants or alternatives of the invention are defined in the dependent claims.

The present invention achieves the objects established above by a set of dependent claims.

BRIEF DESCRIPTION OF THE DRAWINGS

The invention will hereinafter be described further with reference to the drawings showing several embodiments, where the figures show the following.

DETAILED DESCRIPTION

The invention will hereinafter be described further with reference to the drawings showing several embodiments.

Figure 1:
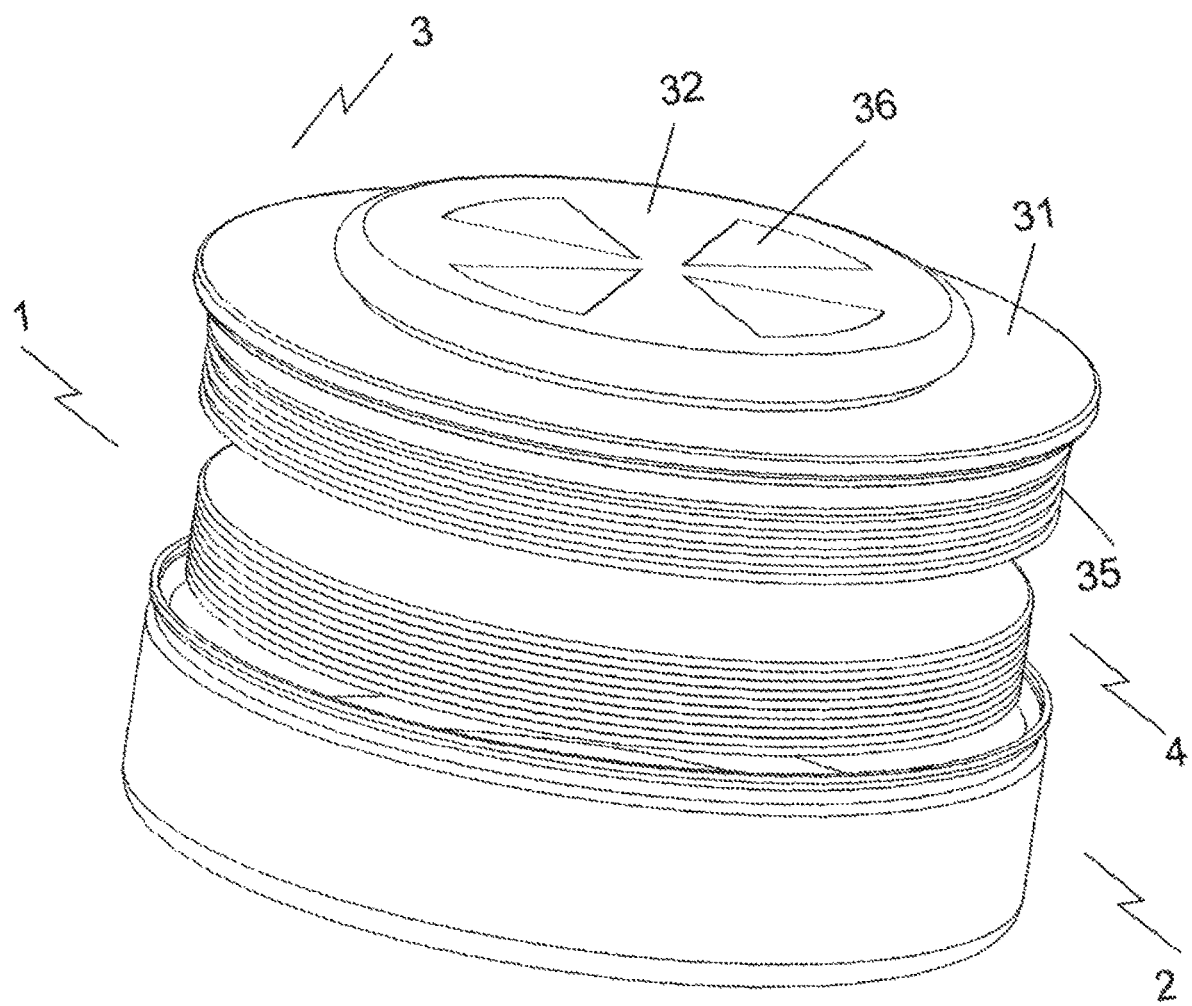
FIG. 1 shows an isometric outline of a container according to the present invention in an open state, in which the container's base and lid are illustrated together with a typical example of content in the shape of a food product.

FIG. 1 shows an isometric outline of a container (1) according to the present invention in an open position, where a base (2) and a lid (3) are illustrated along with a typical example of content (4) in the form of a food product.

The design of the container (1) may advantageously be adapted to the food products or other content (4) to be stored so that the volume of air remaining in a storage volume (23) is minimized when the container (1) contains said food product, and the container (1) is in closed position. The embodiment of FIG. 1 is designed with a mainly circular symmetrical cross-section well suited for food storage (4), as, e.g., potato cakes, tortillas, pancakes, and more. The inner diameter of the storage volume (23) will generally be fixed, so that the container (1) can advantageously be produced in various sizes that are adapted to the food products. The lid (3) in the present embodiment comprises a disc shaped main part (31) having an elevated center portion (32) and a bellows-shaped structure (33). The lid (3) is shaped as one body. The main part (31) of the lid (3) can be designed to be "snapped" firmly to the base (2) as further detailed. Alternatively, the lid (3) may be placed with a fastener in the shape of a bayonet fitting or threaded screw solution for fastening to the base (2). A suitable embodiment of the lid (3) with openings (36) which makes it easier to turn the lid (3) by opening and closing is described below.

Although the illustrated embodiment is designed with a mainly circular horizontal cross-section, other embodiments may be envisaged as for instance oval or square horizontal cross-section. The shape can advantageously be adapted to the intended content in the container.

The figure illustrates an example of how one or more openings (36) may be provided in the lid (3) to let air into the lid (3) so that it adapts more easily to the shape of the contents. In an advantageous embodiment, there is only one relatively large opening (36). Further, the openings (36) allow for internal cleaning of the lid (3) for instance in a dishwasher.

Figure 2:
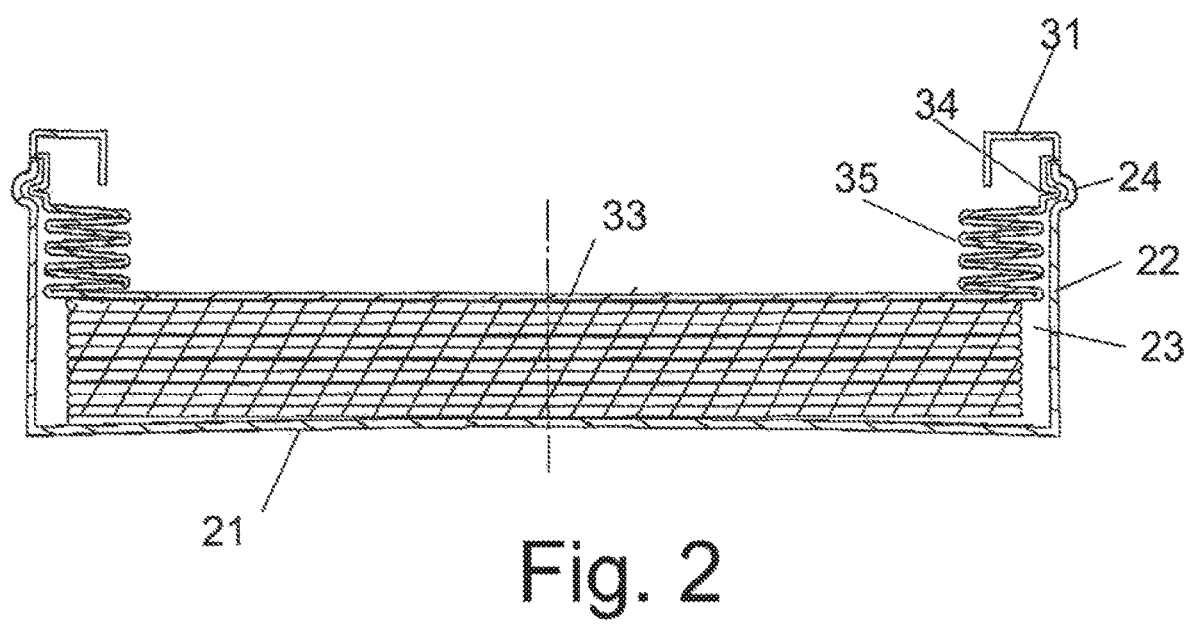
FIG. 2 shows a cross-section of a container according to the present invention in a closed condition, in which the container's base and lid are illustrated together with a typical example of content in the shape of a food product, wherein the main part of the lid comprises a raised central part with a shape for openings.

FIG. 2 shows a cross-section of a container (1) according to the present invention in a closed condition, in which the base (2) and lid (3) of the container are illustrated along with a typical example of a food product (4). The base (2) is provided with a mainly circular disk shaped bottom (21) and a mainly cylindrical side wall (22).

The base bottom (21) in the present embodiment has a flat shape, which will often be suitable, where the base bottom (21) further has an approximately uniform thickness all over the circular disk. A flat shape can contribute to the fact that the ratio of fullness of the volume (23) is optimized by the fact that those food products (4) abutting against the lid base (33) of the lid (3) and bottom (21) are shaped as similarly as possible with the part of the container last mentioned.

Holes are provided to allow air to pass in and out of the volume in the lid (3) since said volume (23) will vary depending on for instance the ratio of fullness of the container (1).

The side wall (22) of the base (2) is further provided with an outwardly projecting flange (24). Said flange (24) is arranged near the opposite end of the cylindrical side wall (22) relative to the bottom (21). The flange (24) thereby forms a near-circular depression on the inside of the cylindrical side wall (22). The flange (24) does not need to protrude as long as the depression is suitable for receiving a corresponding elevation in the lid (3) as described below.

The lid (3) is, as briefly explained above, provided with a mainly circular disc-shaped main part which by a surface near its periphery is suitable to abut against the end face of the side wall (22) and thereby help to form a closed storage volume (23). The lid (3) further includes a concave, outwardly extending elevation having a shape which is adapted to the above mentioned flange (24) such that said two forms (34, 24) further effectively add to sealing the storage volume (23). Further, the elevation and depression are arranged so that the lid (3) "snaps" shut to the base (2), which helps to keep the lid (3) fixed; thus the flange 24 and the depression 34 cooperatively act as closing devices. The side wall (22) with the outwardly extending flange (24) is designed to allow insertion of a base (33) of the lid (3), where the lid base (33) is mainly congruent with an internal cross-section of the base (2) of the container. The base (2) of the container is, in the illustrated embodiment, mainly cylindrical with a mainly circular cross-section. This is also significant for the solution to minimize the excess volume.

The lid (3) is provided with an adaptation device which in the present embodiment are bellows (35) carefully adapted to the diameter of the base (2). The lid's bellows (35) will without food product or the like in the storage volume press the bottom (33) of the lid (3) against the bottom (21) of the base (2). The lid's bellows (35) will be resilient and will in compressed position allow the base (2) to be virtually completely filled. When the food products (4) are placed inside, the bellows (35) will press the bottom (33) of the lid (3) against the food product (4). When the lid (3) is placed on the base (2) the air will be displaced, and the food product (4) is sandwiched between the base (2) and lid (3) in a space nearly void of air.

It is essential that when the lid (3) is placed on the base (2), the air or other gas in the storage volume is displaced and will leave the base (2) before the container (1) is closed by cooperation between the closing devices (24, 34). This will help to provide effective evacuation of excess air and good adaptation of volume to the content. When the container (1) is closed in that the lid base (33) of the lid (3) is pushed into the base (2), the periphery of the lid base (33) of the lid (3) typically follows the walls (22) of the base (2) tightly so that a user gets a clear feeling that the air in the storage volume is displaced. Typically, the lid (3) slides slowly down into the base (2) as a consequence of the fact that excess air needs to get out and passes the lid (3) with its lid base (33) and resilient adaptation device (35). This provides a cushioning of the lid's (3) movement into the base (2) that a user will get a sense of. The solution will force excess air out; something a user will be able to feel as a movement of air against his hands as it emits.

When the lid (3) is not loaded, the distance from the lid closing device (34) to the lid base (33) of the lid (3) along the adaptation device (35) is greater than the distance from the base closing device (24) to the bottom (21) of the base (2) along the side wall (22). The lid's (3) total height is thus typically greater than the depth of the base (2) of the container (1). When the lid (3) is pushed into place so that the closing devices (24, 34) engage, the adaptation device (35) of the lid (3) will be somewhat compressed. This will be true even when the storage volume is empty as the lid base (33) of the lid and the base bottom (21) will be moved toward each other under pressure. This causes the remaining volume to be reduced to a minimum even with small amounts of content in the storage volume (23).

In FIG. 2, the lid (3) is provided with an opening in the main part of the lid (31), where the opening is circularly shaped as seen along the lid's (3) center line, and substantially greater than the remaining area of the top of the main part of the lid (31). The main part of the lid (31) is formed with a downwardly extending edge along said circular shaped opening. Said downwardly extending edge helps to provide the lid (3) with the required mechanical stability. The relatively large and continuous opening provides easy cleaning and reduced manufacturing costs.

Figure 3:
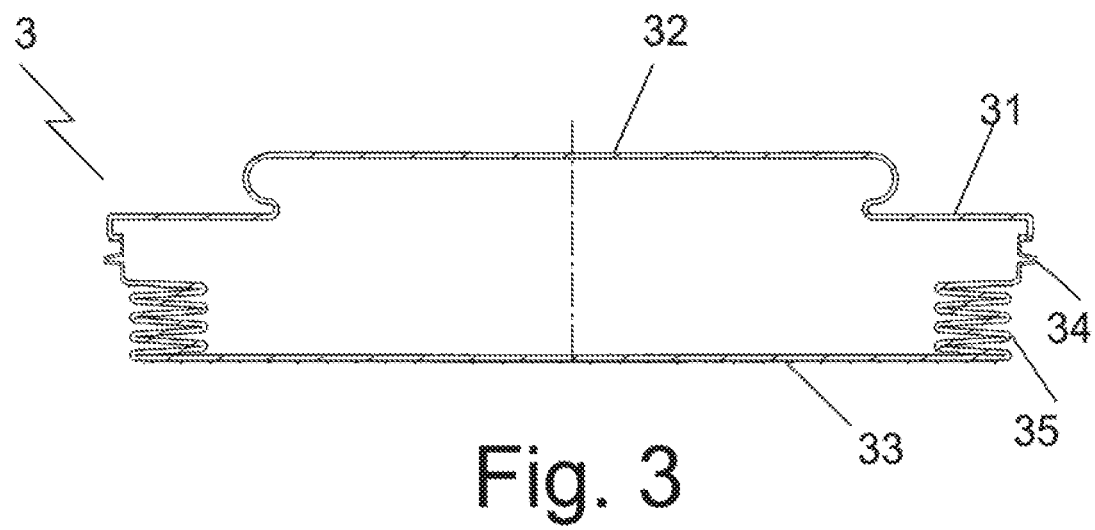
FIG. 3 shows a cross-section of a lid for a container according to the present invention, where the lid comprises an adaptation device in the shape of a resilient structure, here with a bellows-like shape.

FIG. 3 shows a cross-section of a lid (3) for a container (1) according to the present invention, where the lid (3) comprises an adaptation device (35) in the shape of a resilient construction, here with a bellows-like shape. The main section (31) of the lid (3) here includes a circular, upwardly extending center portion that provides the lid (3) with mechanical stability, and that can be designed so that it is suitable to grip when handling the lid (3), for example by opening or closing the container (1).

Figure 4:
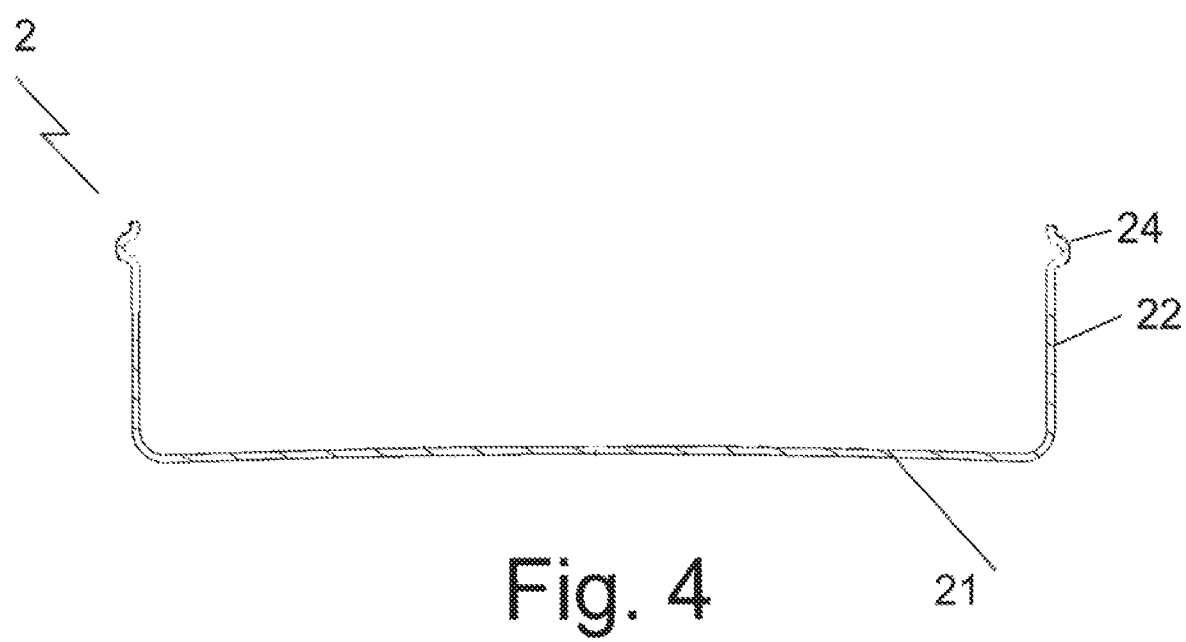
FIG. 4 shows a cross-section of an example of a base of a container according to the present invention.

FIG. 4 shows a cross-section of an example of a base (2) of a container (1) according to the present invention. At the top of the side wall (22) of the base (2) there is provided a flange (24) suitable for functioning together with an accompanying lid (3).

Figure 5:
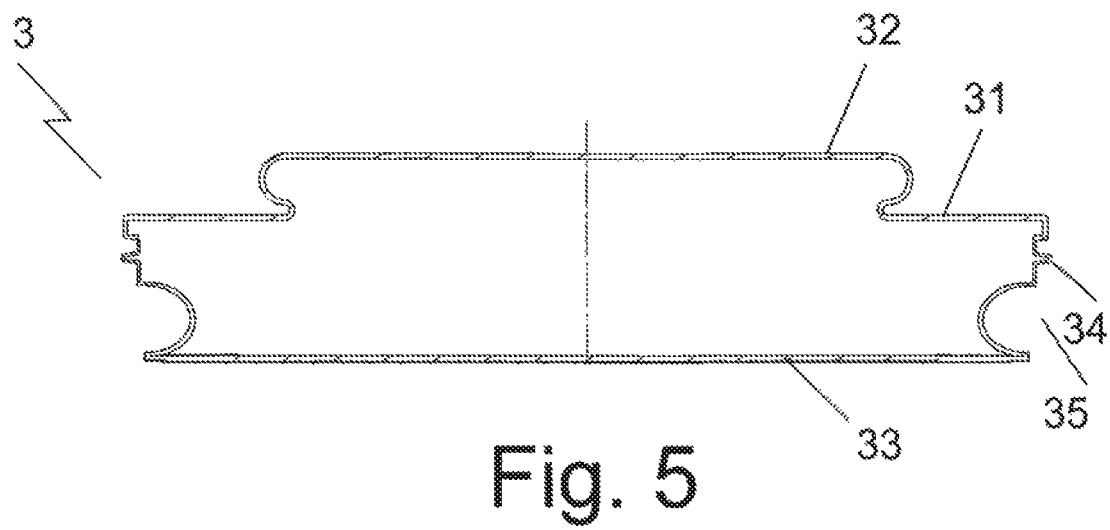
FIG. 5 shows a cross-section of a lid for a container according to the present invention, where the lid comprises an adaptation device in the shape of a U-shaped structure.

FIG. 5 shows a cross-section of a lid (3) for a container (1) according to the present invention, where the lid (3) comprises an adaptation device (35) in the shape of a U-shaped structure.

Figure 6:
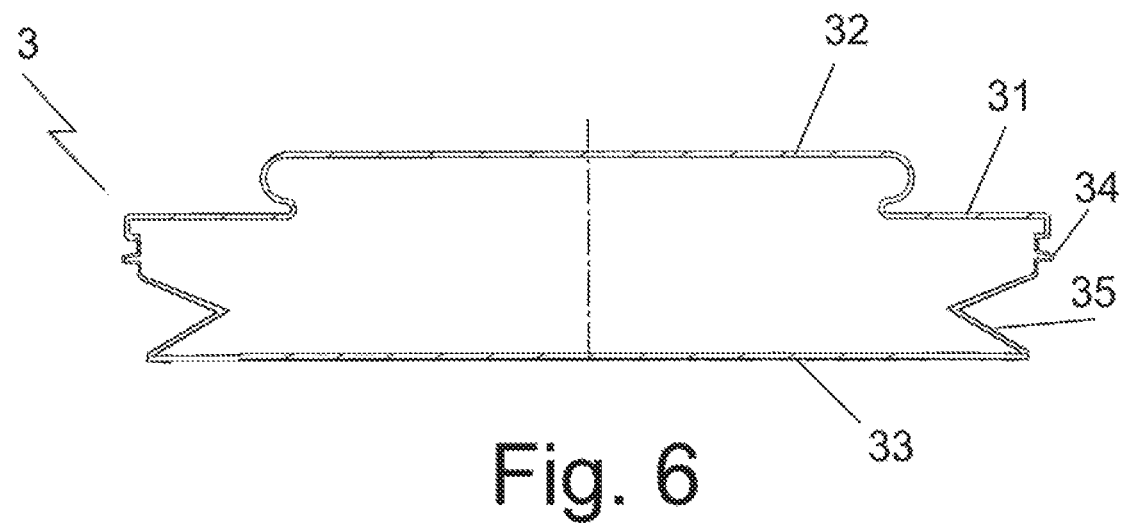
FIG. 6 shows a cross-section of a lid for a container according to the present invention, where the lid comprises an adaptation device in the shape of a V-shaped structure.

FIG. 6 shows a cross-section of a lid (3) for a container (1) according to the present invention, where the lid (3) comprises an adaptation device (35) in the shape of a V-shaped structure.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A container for storing content (4), where the container (1) comprises a base (2) and a lid (3) and said lid (3) and base (2) are adapted to form an air tight storage volume (23); characterized in that
the base (2) and lid (3) comprise, respectively, a base closing device (24) and a lid closing device (34) arranged so that the base closing device and the lid closing device cooperate to close the container (1) and releasably limit relative movement between the base (2) and the lid (3), wherein the lid (3) further comprises a lid base (33) and an adaptation device (35) arranged between the lid closing device (34) and the lid base (33), wherein the lid (3) is one body, and wherein the lid base (33) is congruent with an internal cross-section of the base (2), the lid base (33) having no openings and having a periphery selected to cooperate with the base (2) such that a user is able by hand to detect gas compression when the lid (3) is urged into the base (2), wherein the adaptation device (35) is arranged to push the lid base (33) from the lid closing device (34) toward a bottom (21) of the base (2) for adaptation of a storage volume (23) to the content (4) in the container (1) to minimize the storage volume (23) when the container (1) is in a closed state, the storage volume (23) being defined between the lid base (33) and the bottom (21) of the base (2), wherein when the lid (3) is not loaded, a distance from the lid closing device (34) to the lid base (33) along the adaptation device (35) is greater than a distance from the base closing device (24) to the bottom (21) of the base (2).

2. The container according to claim 1, wherein the lid base (33) and the adaptation device (35) are arranged to adapt the storage volume (23) when the lid (3) is placed on the base (2) before the container (1) is closed by cooperation between the base closing device (24) and the lid closing device (34).

3. The container according to claim 1, wherein the adaptation device (35) comprises a resilient structure.

4. The container according to claim 3, wherein the resilient structure comprises one of a bellows, a V-shape and a U-shape.

5. The container according to claim 3, where the resilient structure provides a resilient force to minimize the storage volume (23) to the content (4).

6. The container according to claim 1, wherein the adaptation device (35) forms a closed structure between the lid base (33) and the lid closing device (34).

7. The container according to claim 1, wherein the lid (3) is designed so that in a non-loaded position, a distance from the lid closing device (34) to the lid base (33) along the adaptation device (35) is greater than a distance from the base closing device (24) to the bottom (21) of the base (2) along a side wall (22), so that when the closing devices (24, 34) engage, the adaptation device (35) will be compressed so as to minimize the storage volume (23).

8. The container according to claim 1, wherein the closing devices (24, 34) each comprises a projecting part and a correspondingly shaped receiving part arranged to fix the lid (3) to the base (2), where the projecting part is comprised of the lid closing device (24) and the receiving part is comprised by the base closing device (34).

9. The container according to claim 1, wherein the closing devices (24, 34) comprise a bayonet fitting or a threaded screw.

10. The container according to claim 1, wherein the lid base (33) and the adaptation device (35) are adapted to the base (2) so that gas in the storage volume (23) is allowed to evacuate when the lid (3) is placed on the container (1) to minimize the storage volume (23).

11. The container according to claim 1, wherein the lid (3) comprises one or more openings (36) to let air in and out of a lid inner volume to provide effective adjustment of the lid (3) to the storage volume and to provide access to the lid base (33) for cleaning.

12. The container according to claim 11, wherein the openings (36) are to enable use thereof when opening and closing the container (1).

13. The container according to claim 12, wherein the lid (3) comprises spoke like elements from the center of the lid (3) toward a periphery of the lid (3), and wherein the openings (36) are defined by the spoke like elements.

14. The container according to claim 11, wherein the lid (3) comprises a circularly shaped opening disposed symmetrically around the lid (3) center line, wherein the circularly shaped opening is larger than a remaining area of a top of a lid body (31).

15. The container according to claim 1, wherein the base (2) is cylindrical with upward rising walls (22) arranged perpendicularly to the bottom (21) of the base (2).

16. The container according to claim 15, wherein the bottom (21) of the base (2) is circular.

17. The container according to claim 15, wherein the container (1) is adapted to contain food products shaped in a form of a circular disc.

18. The container according to claim 1, wherein the lid base (33) has a cross-section which is the same as a cross-section of the base (23).

19. The container according to claim 1, wherein the container (1) is formed from at least one of plastic, glass and metal.

* * * * *